United States Patent
Mehnert et al.

(10) Patent No.: US 6,923,637 B2
(45) Date of Patent: Aug. 2, 2005

(54) BLOW MOLDING MACHINE

(75) Inventors: Gottfried Mehnert, Berlin (DE); Ulrich Hennemann, Traismauer (DE)

(73) Assignee: BEKUM Maschinenfabriken GmbH, Berlin (DE)

( * ) Notice: Subject to any disclaimer, the term of this patent is extended or adjusted under 35 U.S.C. 154(b) by 230 days.

(21) Appl. No.: 10/423,347

(22) Filed: Apr. 25, 2003

(65) Prior Publication Data

US 2004/0213870 A1 Oct. 28, 2004

(51) Int. Cl.$^7$ .................. B29C 49/32; B29C 49/56; B29C 49/76
(52) U.S. Cl. ............... 425/525; 425/531; 425/532; 425/535; 425/538; 425/541
(58) Field of Search ................. 425/525, 531, 425/532, 535, 538, 541

(56) References Cited

U.S. PATENT DOCUMENTS

| | | | |
|---|---|---|---|
| 3,115,673 A | 12/1963 | Rudolph | 425/538 |
| 3,340,569 A * | 9/1967 | Hagen | 425/532 |
| 3,685,943 A | 8/1972 | Fischer | 425/541 |
| 3,767,747 A | 10/1973 | Uhlig | 425/532 |
| 3,796,531 A * | 3/1974 | Bowers | 425/541 |
| 3,837,780 A * | 9/1974 | Strong | 425/532 |
| 3,978,184 A | 8/1976 | Dybala et al. | 425/534 |
| 4,022,561 A * | 5/1977 | Strong | 425/541 |
| 4,259,056 A | 3/1981 | Rees et al. | 425/533 |
| 4,468,368 A | 8/1984 | Hafele | 425/525 |
| 4,759,708 A * | 7/1988 | Hestehave et al. | 425/538 |
| 5,114,335 A | 5/1992 | Tinsley | 425/577 |
| 5,639,415 A | 6/1997 | Kato et al. | 264/532 |
| 5,641,451 A | 6/1997 | Orimoto et al. | 425/526 |
| 5,698,241 A | 12/1997 | Kitzmiller | 425/532 |

FOREIGN PATENT DOCUMENTS

| | | |
|---|---|---|
| DE | 1604634 | 12/1970 |
| DE | 2413101 | 10/1975 |

* cited by examiner

Primary Examiner—Robert B. Davis
(74) Attorney, Agent, or Firm—Greer, Burns & Crain, Ltd.

(57) ABSTRACT

Each of the clamping plates of the closing unit of the blow molding machine has secured thereto a pivotable locking means which in the calibration position in the swung-up state comes into engagement with a plate which is part of the calibration device. A short friction-type connection which is symmetrical relative to the mold parting plane is thereby established between the blow mold and the calibration cylinder during calibration so that the calibration forces are transmitted in an exact manner. The locking means swing downwards when the blow mold is opened and/or the closing unit returns to the head station. Collisions with other machine parts are thereby ruled out.

15 Claims, 4 Drawing Sheets

BLOW MOLDING MACHINE

Figure 1:
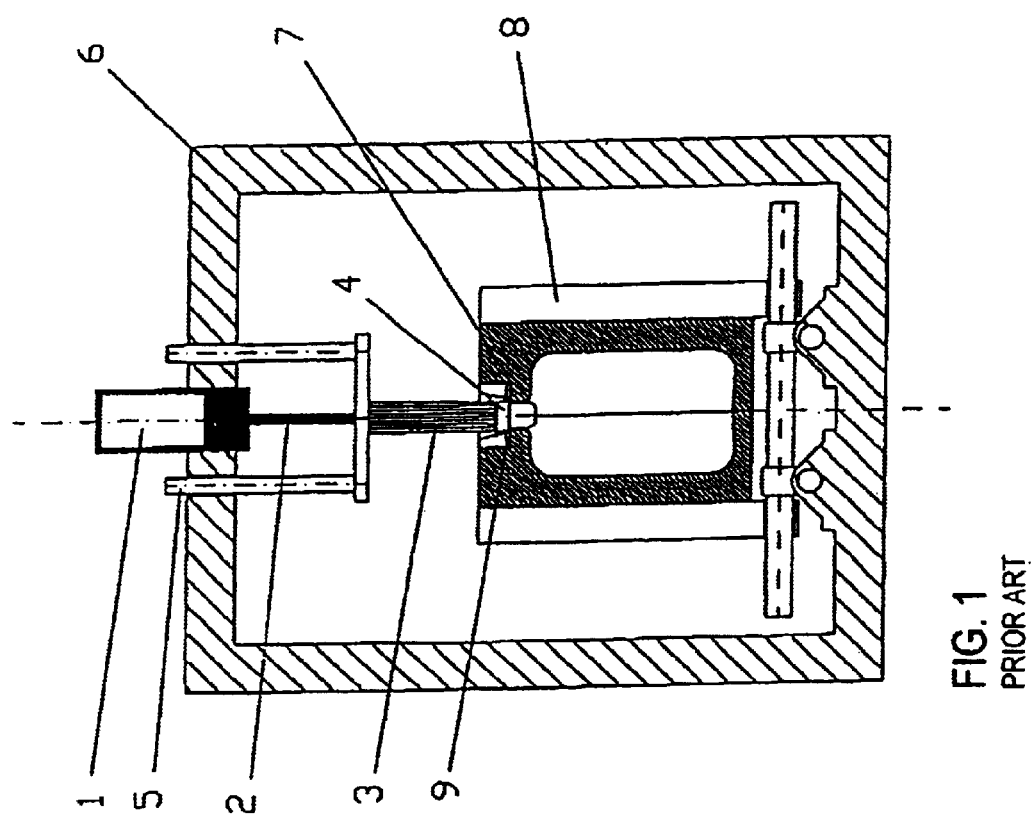

The present invention relates to a blow molding machine including a closing unit which comprises blow mold halves mounted on clamping or closing plates, and which is movable between a head and a calibration device including a calibration cylinder whose piston rod is connected to a blow pin and to a cutting ring that is pressed against a cutting jaw of the blow mold during calibration.

In the blow molding process a preform is first of all produced that is then enclosed by a blow mold. In the blow mold, the preform is most of the time inflated with air via one or several blow pins, which is often carried out at the place that will later be the filling opening of the finished container. To make this opening tightly sealable, its edge should be as smooth as possible. Particularly in the production of beverage bottles or canisters, this is accomplished in that the blow pin is provided behind its tip with a small step, the so-called cutting ring, which is pressed with great force against a correspondingly shaped and hardened mating surface of the blow mold, the so-called cutting jaw. In this process, the waste from the upper edge of the filling opening is additionally pre-punched or separated. This procedure has been standard since a long time and has turned out to be useful.

The quality of the sealing surface of the container produced in this way and the service life of cutting ring and cutting jaw depend, inter alia, on how the components of the blow molding machine that are involved in the friction-type connection behave under load. Already slight eccentricities in the order of a few hundredths of a millimeter or a position of the blow pin changing under load relative to the blow mold result in increased wear of the contact surfaces and thus in shortcomings in the containers produced.

This problem will be described in more detail in the following in connection with the enclosed FIG. 1, which shows a conventional arrangement of a calibration device which has positioned thereunder a closing unit. The calibration force is exerted via a hydraulic cylinder 1 whose piston rod 2 is centrally connected to a blow pin 3 that comprises the above-mentioned cutting ring 4 behind its tip. The blow pin 3 is additionally guided by a guide 5, as is the case most of the time, the guide 5, just like the hydraulic cylinder 1, being firmly mounted on the machine frame 6 which has a rectangular form when viewed in FIG. 1.

The blow mold halves 7 are also firmly connected to the machine frame via the clamping plates 8 closed under the closing force. The blow mold comprises the cutting jaw 9.

Hence, in this conventional arrangement, the "friction-type connection" is established via the following components: hydraulic cylinder 1—blow pin 3—cutting ring 4—cutting jaw 9—blow mold halves 7—clamping plates 8—machine frame 6—hydraulic cylinder 1.

The arrangement shown in FIG. 1 is ideal with respect to symmetry. Despite the many components involved in power transmission and despite the relatively long transmission paths, an exact blow pin guidance is possible.

A drawback is inter alia that the machine frame must be made very stable (which is cost-intensive), that the shape and the surrounding devices are in part difficult to access (ease of handling), and that it may be troublesome or altogether impossible to build a symmetrical machine frame for an asymmetrical closing unit.

Figure 2B:
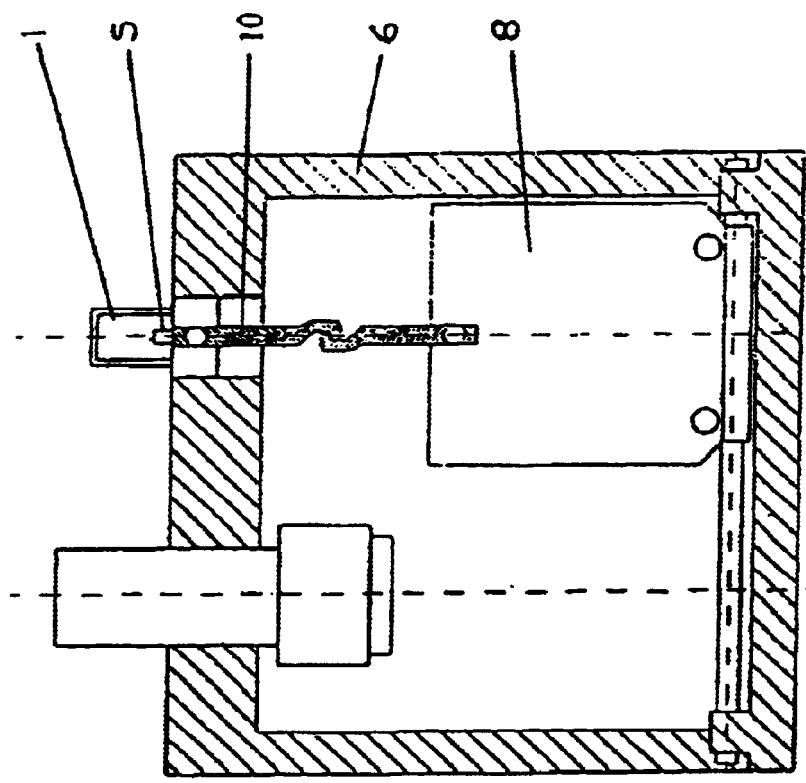

As an alternative, the "hook solution" was offered on the market very early and is nowadays realized in the majority of the continuously operating blowing machines. The principle is illustrated in FIGS. 2a and 2b.

Figure 2A:
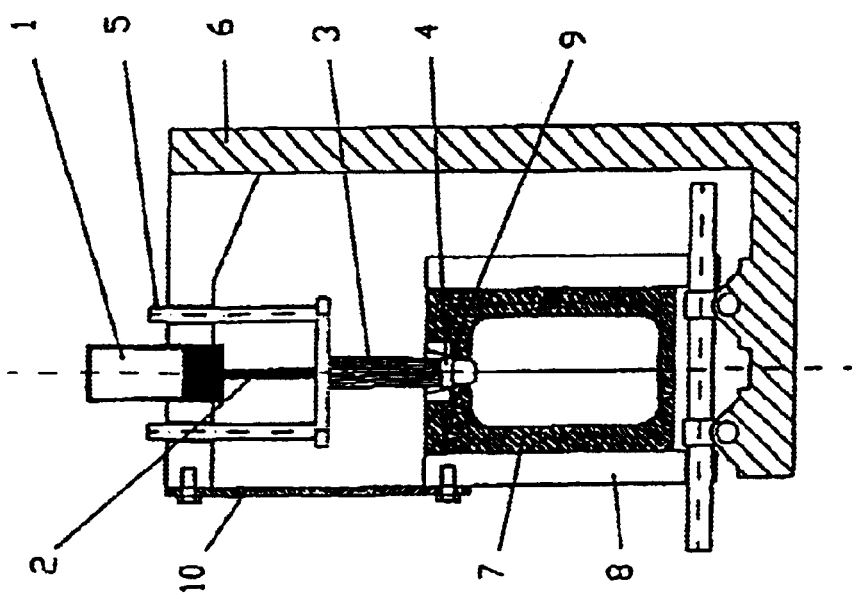

As can be seen in FIG. 2a, the right part of the machine is identical with the case described under FIG. 1. The power flow is the same as described there. The left part of the machine frame was replaced by a rigid hook connection (10), which can even more clearly be seen in the front view (FIG. 2b).

The basically different elastic behavior of the two power connections can partly be compensated via the hook play. It is only when calibrating force and machine size have reached a specific order that the differences are felt: The blow pin guidance is no longer sufficient and leads to the above-mentioned deficiencies in production.

It is therefore the object of the present invention to develop a blow molding machine of the above-mentioned type in such a way that a transmission of the calibration forces is ensured that is as exact as possible.

According to the invention this object is achieved by the features of patent claim 1.

Advantageous developments of the invention are characterized in the subclaims.

According to the invention the blow mold is connected to the calibration device over a "short path", but only for the time interval during which the closed blow mold is located below the calibration device.

The obvious idea, i.e. to install the hook screwed at the front to the closing plate in the same way to the rear closing plate as well, is abortive in most applications because of unavoidable collisions with other machine parts. That is why fastening or coupling means are secured to the clamping plates. During calibration these means are in frictional engagement with a mounting that is part of the calibration device. Said fastening or coupling means are preferably locking means, which will be designated as "locks" in the following for the sake of simplicity.

This yields a short friction-type connection that is symmetrical to the mold parting plane and exists between the blow mold and the calibration cylinder, said connection ensuring a very exact transmission of the calibration forces.

Since the power flow created by the reaction forces and existing between the blow mold halves and the calibration cylinder is short and identical for both blow mold halves, an angular or eccentric deflection of the calibration device and of the associated blow pin can largely be ruled out.

Furthermore, it is intended according to the invention that the locks are pivotable and, in the swung-up state, are in frictional engagement with the mounting, and that they will only assume this swung-up state when the closing unit is in the calibration position and the blow mold is closed. In all other operational phases the locks are in a swung-down state, so that it is ensured that in all movements of the closing unit and the blow mold that are arising, collisions with other machine parts are ruled out. Operational reliability of the blow molding machine is thereby ensured.

In further details it is suggested that the locks should have the shape of a hook whose angled end section grips over a contact surface of the mounting. Expediently, each clamping plate is provided with a lock that is centrally mounted on the clamping plate, but it is also within the scope of the invention that more than one lock per clamping plate may be provided for.

The locks are pivotable about horizontal axes, and the pivotal range of each lock is preferably 90°, which means that the locks are pivotable from a horizontal position into a vertically upwardly projecting position to get into engagement with the mounting of the calibration device above the blow mold.

In a preferred embodiment, this mounting has a reversely U-shaped frame with a horizontal plate through which the calibration cylinder passes centrally, and with vertical legs from the free ends of which the contact surfaces project to the outside that are gripped over by the locks. The mounting is of a symmetrical type relative to the central longitudinal axis thereof and its vertical legs extend at both sides of the piston rod in parallel with said rod.

The contact surfaces of the mounting that come into engagement with the end sections of the locks that are angled in the manner of a hook may be formed by plates which are attached to the free ends of the vertical legs of the mounting and project to the outside beyond the legs.

It has further been suggested with great advantage that each lock is non-rotationally connected to an associated rotational shaft that communicates with a cam gear that is non-rotatable, but arranged to be axially displaceable relative to the rotational shaft, and that upon impingement of the cam gear on a stop said cam gear is displaced, thereby rotating the rotational shaft of the lock and thus the lock.

In further details, the design may be chosen such that each rotational shaft has firmly attached thereto a rigid linkage that extends in axial direction and is seated with a roll in a spiral-like groove of the cam gear. The cam gear, in turn, is provided with a lateral rigid arm which engages with a roll into an axial guide path, whereby the cam gear is held in an axially displaceable, but non-rotatable manner.

When the cam gear impinges with a press pin projecting from the front side thereof, on the stop intended for this purpose, it is thus displaced against the force of a spring in the direction of the rotational shaft, with the linkage being moved by its seat in the spiral groove of the cam gear in the circumferential direction thereof, whereby the rotational shaft is rotated or pivoted with the hook.

The two stops for the cam gear are positioned such that the cam gear will only abut on the stops when the closing unit is positioned on the calibration station and the blow mold is closed.

Furthermore, it is suggested that the piston rod is connected to a U-shaped guide whose vertical bars are guided in passage holes of the horizontal plates of the mounting. This also contributes to the exact transmission of the calibration forces.

Furthermore, it may be intended that the calibration device is suspended via a hinge from the machine frame which because of the short friction-type connection need not have the shape of a closed rectangular frame, as is the case with conventional blowing machines. Instead of this, the calibration device can be suspended from an upper leg of the machine frame that extends only over half the width.

In the blow molding machine according to the invention, the work cycle is as follows:

1. The closing unit is positioned below the head; the locks are swung down.
2. The blow mold is closed; the locks carry out said movement "inwards" in the swung-down state; the closing unit moves to the calibration station.
3. Before the end position is reached, the two cam curves abut on the associated stops and effect the upward swinging of the locks. The contact surfaces of the locks and the plates have only a distance of a few tenths of a millimeter from one another.
4. After the blow pin has been moved downwards to the cutting jaw, and upon application of the calibration force, the contact surfaces of plates and locks come to rest on one another, thereby creating the desired "short" and symmetrical friction-type connection between calibration device and closing unit without deviation via the machine frame.
5. End of the blowing operation, pressure relief of the calibration cylinder and opening the blow mold. The stops are left due to the opening movement; the locks swing downwards, supported by spring force.
6. The closing unit moves with the opened blow mold to the head; the locks remain at the bottom.
7. Renewed cycle as above.

As has already been mentioned above, the lock means are designed such that the locks will only be swung upwards when the blow mold is closed and the closing unit is in the calibration station. The stops are here designed such that they fulfill their function independently of the sequence in which the above-described end position is reached. This means that the locks will also be swung upwards by the closing movement of the blow mold when said movement is erroneously carried out only under the calibration station. To this end the stops are provided with corresponding inclined ramps the cam gears abut on during the closing operation, whereby the axial movement needed for pivoting the locks is enforced.

Hence, the locks will swing downwards when the blow mold is opened at the calibration station. Of course, the locks will only swing downwards when the closing unit returns to the head, as should basically be the case.

It is within the scope of the present invention that the pivotal movement of the locks is not coupled with the normal machine movements, as has been described above, but additional actuating elements may be provided for pivoting the locks, e.g. hydraulic cylinders, electric motors, solenoids, or the like, that are activated and monitored by the machine control.

Figures 3A, 3B:
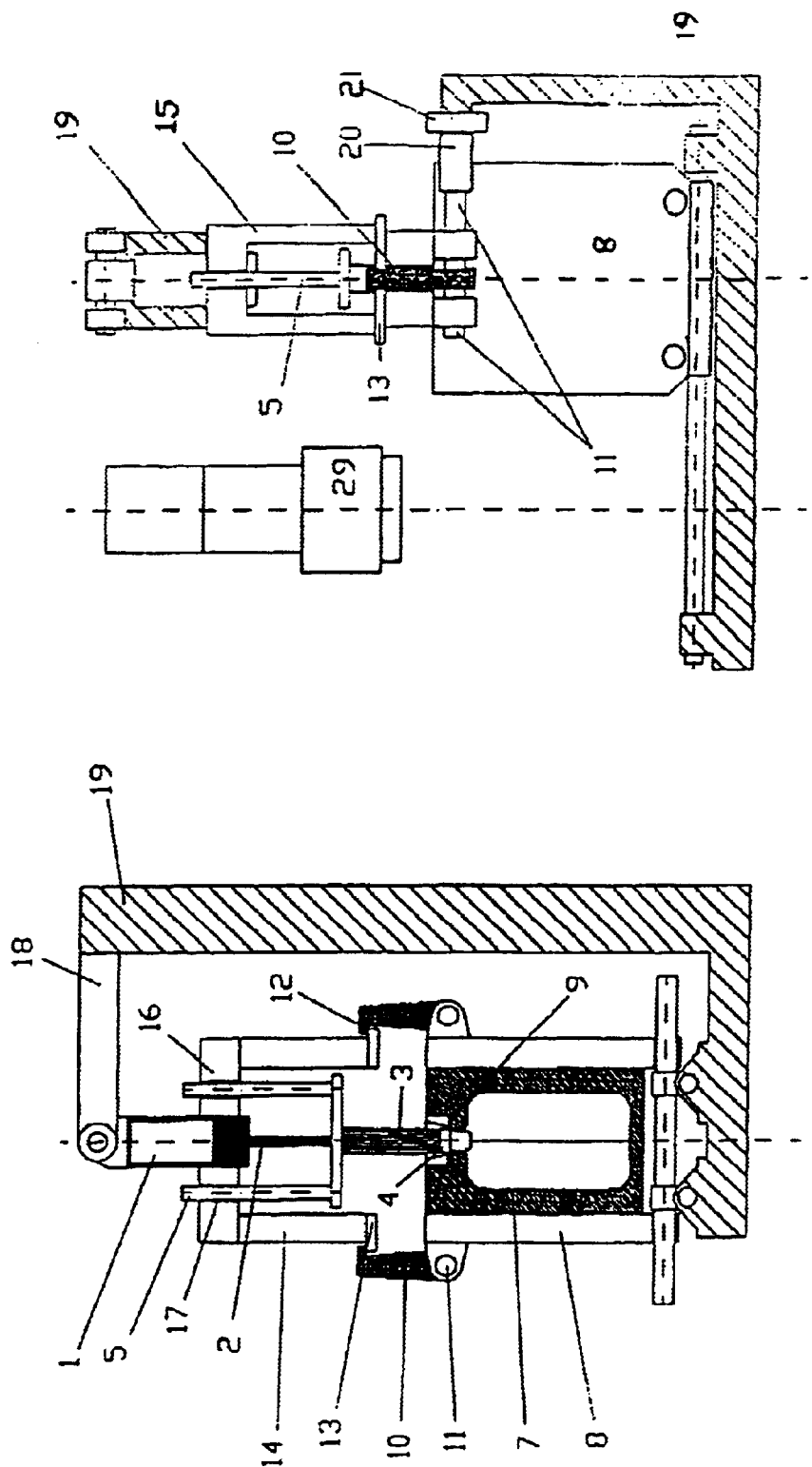
Figure 4:
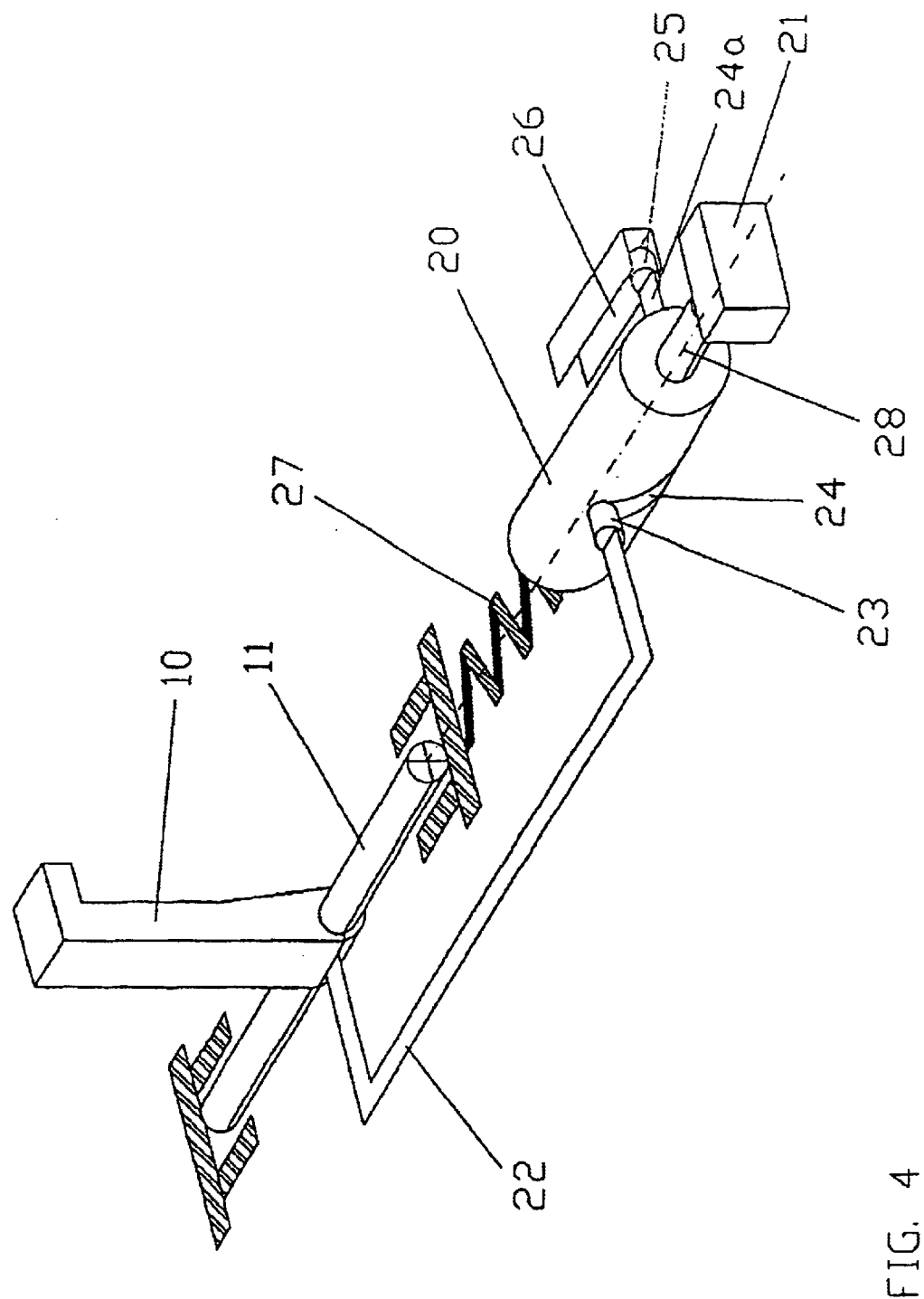

Further details of the invention will become apparent from the following description of a preferred embodiment and from the drawing, which shows in a substantially schematic way in FIG. 1 the symmetrical arrangement of a closing unit at the calibration station according to the prior art;

FIGS. 2a and 2b an arrangement with a rigid hook according to the prior art;

FIGS. 3a and 3b an embodiment of the invention in views similar to FIGS. 2a and 2b; and FIG. 4 a purely schematic perspective view of the lock mechanism.

In FIGS. 3a and 3b, the components corresponding to components of the conventional devices according to FIGS. 1, 1a and 2b are marked with the same reference numerals, reiterative explanations being here omitted.

In the machine of the invention, a lock 10 is respectively hinged to the upper edge portion of the clamping or closing plates 8, the lock 10 having a central longitudinal axis positioned along the central longitudinal axis of the closing plate 8.

The two locks 10 can be pivoted about associated horizontal rotational shafts 11 by about 90°. In the swung-up state, their end sections 12, which are bent in the manner of a hook, rest on the upper sides of two plates 13 that are attached to the lower end of vertical webs 14 of a mounting, which is designated by reference numeral 15 in its entirety. Said mounting 15 is a rigid frame which in the two illustrations of FIGS. 2a and 2b has an inverted U-shaped form.

The mounting 15 is an integral part of the calibration device in that it is firmly connected to the calibration cylinder 1 that centrally passes through the upper horizontal plate 16 of the mounting 15 and is firmly connected thereto.

Two through holes 17 in which the vertical bars 5 of the guide are guided extend at both sides of the calibration cylinder 1 through the upper horizontal plate 16 of the mounting 15.

The whole calibration device is hingedly suspended from an upper horizontal arm 18 of the machine frame 19.

As shown in FIGS. 3b and 4, the lock mechanism comprises a cam gear 20 which impinges at the calibration station on a stop 21 when the blow mold is closed.

Details of the control mechanism are schematically illustrated in FIG. 4. The rotational shaft 11, which is non-rotationally connected to the lock 10, has mounted thereon a rigid linkage 22 which extends beyond the rotational shaft 11 and carries a roll 23 at its inwardly projecting end, the roll being seated in a spiral groove 24 of the cam gear 20. The cam gear 20 is provided with a rigid lateral arm 24a which carries a further roll 25 at its free end. Roll 25 is seated in a guide groove 26 extending in axial direction.

The cam gear 20 is movable against the force of a spring 27 in the direction of the rotational shaft 11, the cam gear 20 being held in non-rotable fashion.

A press pin 28 which abuts on the stop 21 when the closing unit is moved from the head station 29 into the calibration position projects from the front face of the cam gear 20. The distance between cam gear 20 and rotational shaft 11 is reduced against the force of the spring, the roll 23 of the linkage 22 being guided in the spiral groove 24, and the lock 10 being pivoted out of the horizontal initial position into the vertical engagement position.

When the closing unit returns to the head station 29, the locks 10 are pivoted back accordingly.

Although this is not shown in FIG. 4, the stops 21 are provided with inclined ramps on which the press pins 28 of the cam gear 20 abut when the blow mold is only closed at the calibration station.

What is claimed is:

1. A blow molding machine comprising a closing unit which comprises blow mold halves provided on clamping plates and is movable between a head station and a calibration station including a calibration cylinder whose piston rod is connected to a blow pin and a cutting ring which during calibration is pressed against a cutting jaw of the blow mold, comprising
    coupling means secured to the clamping plates which during calibration are in engagement with a mounting, which is part of the calibration station, so that a power flow created by reaction forces between the blow mold halves and the calibration cylinder is relatively short and substantially identical for both blow mold halves.

2. The blow molding machine according to claim 1, wherein the coupling means is locking means.

3. The blow molding machine according to claim 2, wherein the locking means is pivotable and, in a swung-up state, is in engagement with the mounting.

4. The blow molding machine according to claim 2, wherein the locking means comprises hooks, each hook having an angled end section that grips over a contact surface of the mounting.

5. The blow molding machine according to claim 2, wherein the locking means is pivotable about a horizontal axis.

6. The blow molding machine according to claim 2, wherein the locking means is pivotable about 90°.

7. The blow molding machine according to claim 2, wherein the locking means comprises plural hooks, each hook being seated on an associated rotational shaft which communicates with a cam gear that is non-rotatable, but axially displaceable relative to the hook and is displaced against resilient force upon impingement on a stop, thereby rotating said rotational shaft.

8. The blow molding machine according to claim 7, wherein the rotational shaft is firmly connected to a connection linkage which is guided with a roll in a spiral groove of the cam gear.

9. The blow molding machine according to claim 7, wherein the cam gear has secure thereto a lateral arm with a roll seated in an axial guide path.

10. The blow molding machine according to claim 7, wherein a press pin abuts on the stop projecting from the front side of the cam gear.

11. The blow molding machine according to claim 7, wherein the stop is positioned on the calibration station such that the cam gear will only abut on the stop if the closing unit is in the calibration position and the blow mold is closed.

12. The blow molding machine according to claim 2, wherein the mounting comprises an inverted U-shaped frame with a horizontal plate centrally passed through by the calibration cylinder, and with vertical legs from the free ends of which contact surfaces project outwards that are gripped over by the locking means.

13. The blow molding machine according to claim 12, wherein an outwardly projecting plate is respectively attached to the free ends of the vertical legs.

14. The blow molding machine according to claim 12, wherein the piston rod is connected to a U-shaped guide having vertical bars guided in through holes in the horizontal plate of the mounting.

15. The blow molding machine according to claim 1, wherein the calibration station is suspended via a hinge from a machine frame such that its own weight, but not a force created during calibration, can be transmitted to the machine frame.

* * * * *